3,134,809
ALKANESULFONYL HALIDE PRODUCTION FROM
ALUMINUM ALKANE SULFINATES
Charles M. Starks, Ponca City, Okla., assignor to Continental Oil Company, Ponca City, Okla., a corporation of Delaware
No Drawing. Filed Dec. 30, 1960, Ser. No. 79,911
10 Claims. (Cl. 260—543)

This invention relates to a proces for preparing alkanesulfonyl halides. More particularly, it concerns the oxidation of an aluminum alkanesulfinate with a halogen to yield the corresponding alkanesulfonyl halide. Still more specifically, this invention relates to an improved process for the preparation of alkane-sulfonyl halides of the type $RSO_2X$ where R is a straight-chain alkyl group having from two to fifty carbon atoms joined to the sulfur atom at one of the terminal carbon atoms thereof and where X represents chlorine or bromine which comprises reacting an aqueous suspension of an aluminum alkanesulfinate having the formula $(RSO_2)_3Al$ wherein R has the same significance as aforesaid with chloride or bromine. In narrower aspects, the present invention pertains to a highly efficient, continuous method for the production of alkanesulfonyl chlorides or bromines.

The products obtained from the novel processes embodied in this invention are useful in the chemical art and therein find their greatest utility as intermediates for the preparation of numerous and varied derivatives such as, for example, alkane-sulfonic acids, amides, mercaptans and the like which can be beneficially employed as mercerizing assistants, extractants for the refining of oils and gasolines, detergents, other surface-active agents, oil additives and the like. These products per se also exhibit usefulness in various applications such as the treating of leather and textiles. Additionally, they can be used to improve fat liquoring and leather treating processes as well as for fat splitting agents.

A number of methods are known in the art for preparing the organosulfonyl halides, although, curiously enough, most of these methods are primarily directed and presumably limited to the preparation of aryl sulfonyl halides. In general, the disadvantages of the prior art teachings principally concern the very poor yields of the desired product realized in the practice thereof. In contrast to this manifest shortcoming of the prior art, the practice of this invention permits one to readily secure unusually high yields of the desired product. In fact, in the observation of the principles of the invention yields approaching 100% can be obtained routinely which attribute is rarely observed for chemical reactions of this type. Also, my process may be carried out in reactors of very simple design using readily available and relatively inexpensive raw materials.

Briefly stated, the process of my invention comprises reacting at a temperature not in excess of about 40° C. an aluminum alkanesulfinate with either chlorine or bromine in the presence of water, and where the said aluminum alkanesulfinate reactant contains a linear or substantially straight-chain alkyl group having between two and fifty carbon atoms with the alkyl group joined to sulfur atom at one of the terminal atoms thereof. The basic reaction underlying the novel processes set forth herein can be schematically represented by the equation:

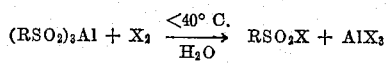

where X is either chlorine or bromine and R represents an alkyl substituent as described directly above.

The alkanesulfinates contemplated as the starting materials in the processes of this invention can be readily and conveniently derived by reacting the corresponding trialkylaluminum compound with sulfur dioxide. In turn, the trialkylaluminum compounds useful in preparing the sulfinate derivatives can be obtained by a recently developed synthesis method which involves reacting lower aluminum alkyls, as for example, triethylaluminum and tripropylaluminum, with a low molecular weight olefin such as ethylene or propylene, and more preferably the former, via a growth process whereby the olefinc monomer progressively adds to the alkyl substituents of the aluminum molecule. This method generally results in a mixture of aluminum alkyl compounds, usually termed a growth product, wherein the alkyl groups are essentially linear in nature and range in carbon chain lengths from about 4 to 20 and somewhat higher. Further details regarding the preparation of these growth products as well as details concerning a method for selectively segregating the various components thereof can be found in U.S. Patent 2,863,896 among others. The methods specifically suggested herein for obtaining the sufinates serving as the starting materials in my process form no essential part thereof but merely represent the most desirable and economical way known at present for obtaining these materials.

As mentioned, the sulfinates for the practice of this invention can be obtained by reacting a trialkylaluminum compound of the class described directly hereinabove with sulfur dioxide. This reaction is advantageously carried out in the presence of a solvent for the sulfur dioxide. Applicable reaction temperatures vary between about 0° and 50° C., although somewhat higher temperatures can be utilized under certain conditions. Because of the tendency of many of the sulfinates contemplated herein to form a gel in the presence of certain solvents, especially when operating as the higher reaction temperatures indicated, it is particularly desirable to select a solvent component which obviates or minimizes this tendency. Suitable among such solvents are ethers, especially the higher boiling ethers, nitrogenous substances not possessing a nitrogen-to-hydrogen bond such as heterocyclic nitrogen bases, disubstituted amides and tertiary amines. Among specific suitable solvents there are: pyridine, triethyl amine, dimethyl formamide, diphenyl ether, dimethyl aniline and the like. Further details pertaining to the above procedure for preparing the sulfinates can be found in British Patent No. 819,181.

The oxidation of aluminum alkyl sulfinates with a halogen in accordance with this invention can be conducted at temperatures ranging from about 0° C. to 40° C. A preferred reaction temperature ranges from about 10° C. to 30° C. It should be noted, however, that temperatures in excess of about 40° C. are to be carefully avoided. The use of temperatures substantially in excess of the maximum indicated increases the amount of halogen incorporated into the oxidized product and thus in using such excessive temperatures, products are obtained consisting of mixtures of alkyl sulfonyl halides and higher halogenated components which necessitate troublesome and needless processing in order to recover the desired end product. Atmospheric pressure is generally employed but sub- and super-atmospheric pressures can be used. The preparation of the sulfonyl halides by oxidation of the corresponding sulfinate with a halogen is a decidedly exothermic reaction. Accordingly, cooling of the reaction mixture is ordinarily indicated. This can be accomplished by adding ice or cold water directly to the reaction mixture or alternatively the reaction mixture can be suitably cooled by indirect heat exchange means.

In batch-type operations an aqueous suspension of the starting aluminum alkyl sulfinate is initially charged to a reaction vessel. Suitable suspensions for carrying out the batch operation comprise from about 1 to 20 parts of the starting aluminum alkyl sulfinate per 100 parts of water. More highly concentrated suspensions can be used but are not preferred because of the additional care required in assuring the maintenance of the suspension in a substantially homogeneous dispersion. Generally, mild agitation of the aqueous suspension is sufficient to maintain homogeneity, and oftentimes if chlorination is the desired mode of operation the agitation provided by bubbling chlorine into the reaction mixture is sufficient to maintain this desired degree of dispersion of the reactant. As inferred, the preferred oxidizing agents of this invention include chlorine and bromine.

When operating according to the batch method, the selected halogen is introduced into the aqueous suspension until all of the existing sulfinate is converted into the corresponding sulfonyl halide. This end-point can be readily determined by noting when no solid phase (suspended aluminum alkyl sulfonyl particles) exist within the reaction sphere. Upon the occurrence of the complete diminution of sulfinate reactant, the agitation, if employed, and the addition of the halogen can be stopped and the reaction mixture allowed to separate into two layers, the bottom organic layer constituting the reaction product. The spent aqueous layer can then be decanted or the desired organic layer can be recovered by drawing same off from the bottom of the reaction vessel. In observing the batch-type process discussed one can realize near quantitative yields of the desired sulfinate product which product even before distillation in most instances is 95–98% pure.

The preparation of the alkyl sulfinate halides in accordance with this invention can be most advantageously carried out by a continuous process. Thus in such a mode, water can be charged to the reaction vessel and the selected aluminum alkyl sulfinate reactant continuously added thereto as finely divided solid particles or as an aqueous slurry of such particles. Concomitantly either chlorine or bromine is introduced into the aqueous reaction medium. It is desirable to agitate the reaction mixture to a degree just sufficient to keep the sulfinate salt introduced therein in suspension. As in the case of the batch-type operation the agitation provided by the bubbling chlorine oftentimes suffices to effect this degree of agitation. In most instances the moderate degree of agitation contemplated will permit the sulfinate halide that forms in the course of this reaction to settle to the bottom of the vessel from whence it can be continuously withdrawn.

As indicated previously, suitable sulfinates for use in accordance with this invention include all the aluminum alkyl sulfinates wherein the alkyl substituent has from 2 to 50 carbon atoms. The preferred sulfinates, however, are those having alkyl substituents ranging from about 2 to 30 carbon atoms. It is also preferred that the alkyl substituents of the starting sulfinates be essentially linear in nature. However, this is not mandatory in the successful operation of the processes of this invention but the stated preference is predicated upon the ready availability of these sulfinates as well as that these particular type of sulfinates yield sulfonyl derivatives having greater usefulness either in themselves or as intermediates in the preparation of other products.

A specific enumeration of the products that can be prepared according to the novel process outlined hereinabove is as follows: ethanesulfonyl chloride, propanesulfonyl chloride, butanesulfonyl chloride, pentanesulfonyl chloride, hexanesulfonyl chloride, heptanesulfonyl chloride, octanesulfonyl chloride, nonanesulfonyl chloride, decanesulfonyl chloride, undecanesulfonyl chloride, dodecanesulfonyl chloride, tridecanesulfonyl chloride, tetradecanesulfonyl chloride, pentadecanesulfonyl chloride, hexandecanesulfonyl chloride, heptadecanesulfonyl chloride, octadecanesulfonyl chloride, nonadecanesulfonyl chloride, eicosanesulfonyl chloride, phenylethanesulfonyl chloride, cyclohexylethanesulfonyl chloride, dichlorocyclohexylethanesulfonyl chloride, isobutanesulfonyl chloride, butanedisulfonyl chloride, cyclopropylbutanesulfonyl chloride and the bromides of the above-enumerated sulfo-organo radicals.

The invention will be further illustrated in conjunction with the following embodiments which are to be taken as illustrative only and not by way of limitation.

EXAMPLE I

Into a suitable reaction vessel equipped with a stirrer and thermometer were introduced 250 parts of water and 25 parts of aluminum-1-octane sulfinate. The aqueous medium was continuously stirred in order to facilitate suspension of the sulfinate component. Chlorine was then passed at a rapid rate through the suspension. The reaction mixture was maintained at a temperature in the range of 10–30° C. by the periodic addition of ice as required. After approximately 15 minutes the aluminum salt disappeared whereupon the reaction was stopped, that is, the introduction of chlorine was ceased and the reaction mixture allowed to settle. Upon settling the sulfonyl chloride layer was withdrawn from the reaction vessel and treated with sodium bisulfite in an amount sufficient to consume the excess chlorine existing therein. Thereupon the reaction product was treated with a small amount of sodium bicarbonate in order to remove a minute quantity of hydrogen chloride present. The product was then dried over magnesium sulfate to give 31 parts (100% yield) of 1-octanesulfonyl chloride of 98.5% purity.

EXAMPLE II

Bromine in the amount of 40 parts was added dropwise into a reaction vessel equipped as in Example I containing 500 parts of water. Simultaneously 24 parts of aluminum hexanesulfinate was added to the reaction vessel at such a rate that the aqueous solution was kept light-orange in color. The temperature was maintained at about 40° C. and the stirring rate was so regulated that the organic phase could be continuously withdrawn as it formed. The series of organic layers thus obtained were combined and dissolved in ether. The ethereal solution was washed with water, dilute sodium bisulfite solution and dried over magnesium sulfate. Evaporation of the ether left 29 parts (84%) of hexanesulfonyl bromide.

EXAMPLE III

A mixture of aluminum 1-alkanesulfinates prepared from a typical sample of growth product (i.e., containing aluminum alkyls wherein the alkyl groups contained from 2 to 22 carbon atoms) was chlorinated according to the method described in Example I. The mixture of alkanesulfonyl chlorides could be partially separated by fractional distillation under reduced pressure. By this method a sample of the product was separated into two fractions, i.e., distillate B.P. up to 140° @ 2 mm. and the bottoms. The distillate contained octane and lower sulfonyl chlorides while the residue contained some octane, but mostly higher sulfonyl chlorides. The mixture of alkanesulfonyl chlorides could be essentially cimpletely distilled through a molecular still. A sample of the alkanesulfonyl chlorides from growth product was fractionated in this way. The results are reported in the following Table I.

chlorine until no solid phase exists within the reaction sphere, separating the reaction mixture into an aqueous and organic layer and recovering the alkane sulfonyl chloride reaction product in the form of said organic layer.

*Table 1*

FRACTIONS FROM (MOLECULAR) DISTILLATION OF GROWTH PRODUCT SULFONYL CHLORIDES

| Material | Boiling Point | | | Composition (Percent Weight) | | | | | | | | | | |
|---|---|---|---|---|---|---|---|---|---|---|---|---|---|---|
| | Temp., °C. | Pressure | g. Weight | $C_2$ | $C_4$ | $C_6$ | $C_8$ | $C_{10}$ | $C_{12}$ | $C_{14}$ | $C_{16}$ | $C_{18}$ | $C_{20}$[1] | Unidentified |
| Starting Material | | | 609.0 | 0.6 | 2.8 | 8.0 | 15.2 | 18.9 | 18.3 | 14.5 | 9.4 | 5.3 | 3.1 | 3.4 |
| Trap Material | | | 123.7 | 3.7 | 17.5 | 24.9 | 13.1 | 3.7 | | | | | | 37.7 |
| Cut 1 | 50 | 0.06 | 43.0 | 0.6 | 3.0 | 32.0 | 34.9 | 3.6 | 2.2 | | | | | 23.7 |
| Cut 2 | 50 | 0.025 | 64.2 | 0.5 | 1.4 | 3.4 | 39.9 | 37.2 | 10.2 | 1.4 | | | | 6.1 |
| Cut 3 | 50 | 0.020 | 60.7 | Trace | 4.8 | 3.2 | 16.5 | 45.8 | 20.9 | 3.2 | | | | 5.6 |
| Cut 4 | 50 | 0.0145 | 37.5 | | | 3.5 | 2.9 | 9.4 | 44.2 | 31.6 | 5.2 | Trace | | 3.2 |
| Cut 5 | 50 | 0.011 | 26.7 | | | 2.3 | 3.1 | 8.2 | 28.4 | 43.1 | 10.6 | Trace | | 4.3 |
| Cut 6 | 60 | 0.014 | 24.7 | | | 0.4 | 1.1 | 1.1 | 20.3 | 55.7 | 18.3 | 2.1 | Trace | 2.8 |
| Cut 7 | 60 | 0.0068 | 28.7 | | | Trace | Trace | 0.9 | 6.0 | 58.6 | 28.9 | 1.9 | Trace | 3.6 |
| Cut 8 | 60 | 0.0058 | 23.6 | | | | Trace | 0.1 | 3.2 | 47.2 | 37.9 | 8.2 | 0.1 | 0.2 |
| Cut 9 | 68 | 0.0032 | 34.2 | | | | | 0.1 | 2.9 | 23.4 | 48.3 | 13.2 | 1.8 | 9.5 |
| Cut 10 | 70 | 0.0030 | 36.5 | | | | | | 2.5 | 19.6 | 33.5 | 27.0 | 5.3 | 11.9 |
| Cut 11 | 80 | 0.0030 | 53.4 | | | | | | | 6.6 | 19.7 | 31.0 | 14.1 | Trace | 25.4 |
| Bottoms | | | 24.8 | | | | | | | | | | | |

[1] And higher.

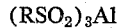

I claim:
1. A process for the preparation of an alkane sulfonyl halide which comprises reacting at a temperature between about 0° C. and 40° C. an aqueous suspension of an aluminum alkane sulfinate having alkyl groups containing not in excess of 50 carbon atoms with a halogen selected from the group consisting of chlorine and bromine until no solid phase exists within the reaction sphere, separating the reaction mixture into an aqueous and organic layer and recovering the alkane sulfonyl halide reaction product in the form of said organic layer.

2. A process for the preparation of an alkane sulfonyl halide which comprises reaction at a temperature between about 0° C. and about 40° C. an aqueous suspension of an aluminum alkane sulfinate corresponding to the following formula:

$$(RSO_2)_3Al$$

wherein R is a straight-chain alkyl group having from two to fifty carbon atoms and attached to the sulfur atom at one of the terminal carbon atoms thereof, with a halogen selected from the group consisting of chlorine and bromine until no solid phase exists within the reaction sphere, separating the reaction mixture into an aqueous and organic layer and recovering the alkane sulfonyl halide reaction product in the form of said organic layer.

3. A process for the preparation of an alkane sulfonyl bromide which comprises reacting at a temperature between about 0° C. and 40° C. an aqueous suspension of an aluminum alkane sulfinate corresponding to the formula $(RSO_2)_3Al$ wherein R is a straight-chain alkyl group having from two to thirty carbon atoms and attached to the sulfur atom at one of the terminal carbon atoms thereof, with bromine until no solid phase exists within the reaction sphere, separating the reaction mixture into an aqueous and organic layer and recovering the alkane sulfonyl bromide reaction product in the form of said organic layer.

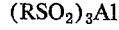

4. A process for the preparation of an alkane sulfonyl chloride which comprises reacting at a temperature between about 0° C. and 40° C. an aqueous suspension of an aluminum alkane sulfinate corresponding to the following formula:

$$(RSO_2)_3Al$$

wherein R is a straight-chain alkyl group having from two to thirty carbon atoms and attached to the sulfur atom at one of the terminal carbon atoms thereof with 5. A process for the preparation of 1-octane sulfonyl chloride which comprises reacting at a temperature between about 10° C. and 30° C. an aqueous suspension of aluminum 1-octane sulfinate with chlorine until no solid phase exists in a reaction sphere separating the reaction mixture into an aqueous and organic layer and recovering the octane sulfonyl chloride in the form of said organic layer.

6. A process for the preparation of 1-octane sulfonyl bromide which comprises reacting at a temperature between about 10° C. and 30° C. an aqueous suspension of aluminum 1-octane sulfinate with bromine until no solid phase exists in a reaction sphere, separating the reaction mixture into an aqueous and organic layer and recovering the octane sulfonyl bromide in the form of organic layer.

7. A continuous process for the preparation of an alkane sulfonyl halide which comprises establishing an aqueous reaction medium maintained at a temperature between about 0° C. and 40° C., continuously injecting within said medium a halogen selected from the group consisting of bromine and chlorine, continuously introducing to the upper portion of said medium an aluminum alkane sulfinate having alkyl groups containing not in excess of 50 carbon atoms and continuously withdrawing the alkane sulfonyl halide product from the bottom of the reaction sphere.

8. A process in accordance with claim 7 wherein said aqueous reaction medium is mechanically agitated so as to maintain substantial homogeneous dispersion within said medium of the aluminum alkane sulfinate present in the reaction sphere.

9. A continuous process for the preparation of an alkane sulfonyl chloride which comprises establishing an aqueous reaction medium maintained at a temperature between about 0° C. and 40° C., continuously injecting chlorine within said medium, continuously introducing to the upper portion of said medium an aluminum alkane sulfinate corresponding to the following formula:

$$(RSO_2)_3Al$$

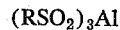

wherein R is a straight-chain alkyl group having from two to fifty carbon atoms joined to the sulfur atom at the terminal carbon atom thereof and continuously withdrawing the alkane sulfonyl chloride product from the bottom of the reaction sphere.

10. A continuous process for the preparation of an alkane sulfonyl chloride which comprises establishing an aqueous reaction medium maintained at a temperature between about 10° C. and 30° C., continuously injecting chlorine within said medium, continuously introducing to the upper portion of said medium an aluminum alkane sulfonyl corresponding to the following formula:

$$(RSO_2)_3Al$$

wherein R is a straight-chain alkyl group having from two to thirty carbon atoms and joined to the sulfur atom at the terminal carbon atom thereof and continuously withdrawing alkane sulfonyl chloride product from the bottom of the reaction sphere.

References Cited in the file of this patent

FOREIGN PATENTS

| | | |
|---|---|---|
| 301,943 | France | Oct. 11, 1900 |
| 1,050,762 | Germany | Feb. 19, 1959 |

OTHER REFERENCES

Migrdichian: "Organic Synthesis," vol. II, pages 1557–1558 (1957).

Ziegler et al.: "Liebig's Annalen Der Chemie," vol. 629, pages 251–256, March 1960.